(12) United States Patent
Bruijns

(10) Patent No.: US 6,891,537 B2
(45) Date of Patent: May 10, 2005

(54) METHOD FOR VOLUME RENDERING

(75) Inventor: Johannes Bruijns, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 622 days.

(21) Appl. No.: 10/071,157

(22) Filed: Feb. 7, 2002

(65) Prior Publication Data

US 2002/0113788 A1 Aug. 22, 2002

(30) Foreign Application Priority Data

Feb. 9, 2001 (EP) .......................................... 01200497

(51) Int. Cl.[7] .............................................. G06T 15/00
(52) U.S. Cl. ...................................................... 345/424
(58) Field of Search ................................ 345/419, 420, 345/424, 426, 589, 596, 606

(56) References Cited

U.S. PATENT DOCUMENTS 6,441,821 B1 * 8/2002 Nagasawa .................... 345/426
6,573,893 B1 * 6/2003 Naqvi et al. ................. 345/424

OTHER PUBLICATIONS

Lacroute et al., "Fast Volume Rendering Using a Shear-Warp Factorization of the Viewing Transformation", Proc. SIGGRAPH 1994, Jul., 1994, pp. 451–458.*
Van Gelder et al., "Topological Considerations in Isosurface Generation", ACM Transcriptions on Graphics, vol. 13, No. 4, Oct. 1994, pp. 337–375.*

* cited by examiner

*Primary Examiner*—Almis R. Jankus

(57) ABSTRACT

The invention relates to a method for rendering of a volume data set on a two dimensional display. According to the method of the invention gradient vectors of voxel values are computed and are replaced by an index into a gradient look up table, thereby reducing the amount of required memory as well as the number of memory accesses during rendering. For each point on a two-dimensional view plane a ray is cast into the volume. Then the volume data is sampled at discrete sample points along each individual ray. During rendering eight gradient vectors of the neighboring voxels at each sample location are retrieved from the look up table. The invention proposes to apply dithering to the gradients before selecting the appropriate index. Recovery of the true gradient value is achieved because of the interpolation. Thus image artifacts, such as intensity bands caused by the discretization of the gradients, are avoided.

8 Claims, 3 Drawing Sheets

METHOD FOR VOLUME RENDERING

The invention relates to a method of rendering a volume data set on a two dimensional display, wherein gradient vectors of voxel values are computed at arbitrary sample positions within the volume by interpolation of gradient vectors of neighboring voxels, the gradient vectors being retrieved from a look up table by means of a gradient index assigned to each voxel.

Furthermore, the invention relates to a computer program for carrying out this method.

Volume rendering is an important field of computer graphics. It is of particular importance for medical applications as it refers to the direct rendering of a volume data set, for example a diagnostic volume image generated by magnetic resonance imaging (MRI), to show the characteristics of the interior of a solid object when displayed on a two dimensional display. In MRI the proton density of human tissue is reconstructed from magnetic resonance signals at each point of a three dimensional grid. This volume data set of equidistant voxels can be displayed by volume rendering for indicating the boundaries of various types of tissue corresponding to the density changes in the MRI data.

Due to the fact that volume rendering is computationally extremely demanding, much effort has recently been made for the development of effective algorithms. Volume data sets are usually quite large. A typical MRI image may contain more than one million voxels. This imposes an additional strain on system resources because of the vast memory requirements.

A method of volume rendering is for example described in the article by Meissner et al., "Vizard II, A PCI-Card for Real-Time Volume Rendering", Proceedings of the 1998 Eurographics/Siggraph Workshop On Graphics Hardware, Lisbon, August 1998. The algorithm proposed in this paper is described in the following.

The volume data set to be rendered comprises of discrete voxels. Each voxel thus has a specific x, y, z position on a three dimensional grid. In addition to its position in space a voxel is characterized by a voxel value defining a spatial intensity distribution, which may, for example, reflect the proton density in a MRI image.

For rendering a volume data set on a two dimensional display a view plane is defined, which depends on the viewing parameters such as eye position, view direction, etc. For each point on the view plane a ray is cast into the volume. Then the volume data is sampled at discrete sample points along each individual ray. For generating sample values at these sample positions the eight neighboring voxels of the grid are trilinearly interpolated.

A color value has to be computed for each pixel on the view plane. Therefore, a gradient vector is required giving the direction and the magnitude of the strongest change of intensity. The gradient vector is thereby orthogonal to a "surface" of constant image intensity in space and can be used to visualize certain boundaries of the displayed solid object. The gradient vectors are used to compute reflected light intensities depending on the orientation of the respective surface relative to a light source. From the gradient direction and the sample value a color and an opacity is calculated at each sample position. These values are accumulated along the ray and are finally composed to give a color value for the respective pixel on the view plane.

The above mentioned trilinear interpolation for the calculation of the sample values at each sample position requires to access eight neighboring voxels. For the computation of the gradient vectors by the differences of six nearest neighbors it is necessary to access 32 voxel values. It turns out that on today's computer hardware it is not feasible to access 32 values in parallel, because in this way the computation of gradient vectors would take too much time. Therefore, the authors of the above article propose to pre-calculate the gradients for each voxel. Instead of storing all gradients at each voxel location, which would require an amount of memory three times as large as the volume data set itself, a table of gradients is generated. Then for each voxel only an index into the gradient table is stored by selecting the index to the closest gradient within the look up table. The gradient at each sample location can then be calculated by performing eight gradient look-ups at each sample location and interpolating the x, y, z components of the returned gradients. The limited number of gradients in the look up table affects the image quality, but a good trade-off between memory requirements and image quality can still be achieved by making the look up table sufficiently large.

By this method a considerable increase of the frame rate is achieved, because the time consuming calculation of gradients by the differences of nearest neighbors is completely avoided during rendering.

A drawback of this known method is that the discretization of gradient values results in undesirable intensity bands in the final image. The emergence of these intensity bands, which lead to a severely decreased image quality, is based on the limited number of gradient vectors in the look up table.

The general object of the present invention is to improve the above described method of volume rendering.

Furthermore, an object of the present invention is to provide an effective method of volume rendering, in which the emergence of intensity bands in the final image is avoided.

In accordance with the present invention a method of volume rendering of the type specified above is disclosed, wherein the aforementioned problems and drawbacks are avoided by applying dithering to the gradient vectors.

According to one aspect of the invention it is possible to apply dithering to the gradient vector at each sample position. This can, for example, be made by adding a pseudo-random value to each component of the respective gradient vector. As a result, for each pixel on the view plane, which corresponds to a constant index value in the look up table, a different intensity value is obtained. This intensity value is randomly distributed around a mean value. By this method the emergence of intensity bands is avoided effectively. But, because of the dithering the resulting image instead has a certain "noisy" appearance, which is still not completely satisfactory.

Therefore, according to another aspect of the present invention, it is also possible to apply dithering to the gradient vectors during the assignment of the gradient indices. In this case, random values are added to the gradient components during the precalculation step, which results in a further increase of rendering speed. Additionally, for the calculation of gradient vectors at each sample position, an averaging of neighboring gradient values is carried out. Because of the dithering of the neighboring gradients the true gradient vector at the sample location is recovered at least partially. Thereby undesirable intensity bands are almost completely eliminated without generating artificial noise in the image. The basic idea of this aspect of the present invention is that a recovery of the original gradient at the respective sample location is achieved by the combination of the different dithered gradient values at the neighboring grid positions. Thus the drawbacks of the discretization of gradients in the look up table are effectively overcome by the method of the invention without any need of additional computing steps during rendering.

With the method of volume rendering defined by the present invention, it is useful to employ a look up table, which contains normalized gradient vectors uniformly distributed on a unit sphere. In this way, the average angular error of the gradient values assigned to each voxel can be minimized, because the look up table contains gradient vectors in every direction in space with equal probability. This is obviously the optimal way to cover the whole three-dimensional vector space of gradient vectors. For the computation of light reflections and light transmissions it is sufficient to restrict the look up table to normalized gradients, because only the direction of the respective surface element is required. Furthermore, a considerable amount of memory is saved by operating with normalized gradients only.

According to the invention, the gradient vectors are normalized after the application of dithering and before the corresponding index into the look up table is assigned to each voxel. Thereby the closest gradient direction stored in the gradient table is selected.

It is useful to renormalize the gradient vector at each sample position after the interpolation of the gradient vectors of the neighboring voxels. This is because after trilinear interpolation of each vector component the resulting gradient vector is no longer normalized.

A computer program adapted for carrying out the method of the present invention performs a preprocessing of a volume data set comprising the steps of
    calculating gradient vectors at each voxel position;
    dithering of the gradient vectors by adding random noise to each vector component;
    assigning gradient indices to each voxel by matching dithered gradient data with corresponding vectors in a gradient look up table; and
    storing gradient indices for each voxel.
For the actual rendering of the volume data on a two dimensional display such a computer program comprises the steps of
    setting up a ray for each pixel in the two dimensional display;
    determining sample points along the ray within the volume;
    computing sample values by interpolation of neighboring voxel values at each sample point;
    computing gradient vectors by interpolation of neighboring gradient vectors at each sample point, the neighboring gradient vectors being retrieved from the gradient look up table according to the respective gradient indices;
    calculating color and opacity values for each sample position; and
    compositing of color and opacity values to a pixel value.
Such a computer program can advantageously be implemented on any common computer hardware, which is capable of standard computer graphics tasks. Especially image reconstruction and displaying units of medical imaging devices can easily be provided with a programming for carrying out the method of the present invention. The computer program can be provided for these devices on suitable data carriers as CD-ROM or diskette. Alternatively, it can also be downloaded by a user from an internet server.

It is also possible to incorporate the computer program of the present invention in dedicated graphics hardware components, such as for example video cards for personal computers. This is particularly reasonable since a single CPU of a typical personal computer is usually not capable of carrying out volume rendering with interactive frame rates. The method of the present invention can, for example, be implemented into a volume rendering accelerator of a PCI video card for a conventional PC. Today's PCI hardware has the capacity and speed which is required for delivering interactive frame rates by use of the above described algorithm.

The following drawings disclose preferred embodiments of the present invention. It should be understood, however, that the drawings are designed for the purpose of illustration only and not as a definition of the limits of the invention. In the drawings.

Figure 1:
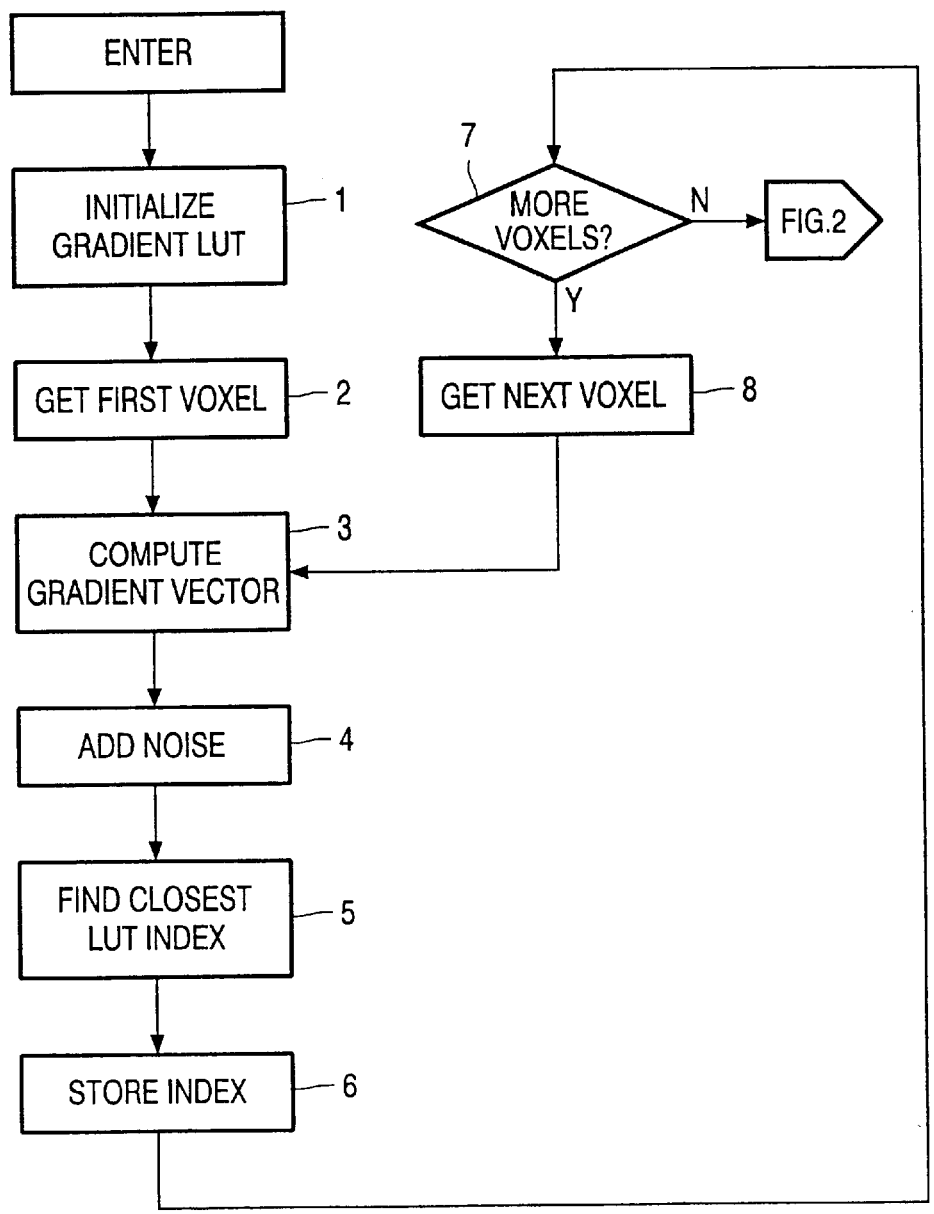
FIG. 1 shows a block schematic diagram illustrating the preprocessing of a volume data set according to the present invention.

FIG. 1 shows a block diagram of the preprocessing of a volume data set, which is carried out at the beginning of the volume rendering. In block 1 the gradient look up table is initialized in calculating a given number of normalized gradient vectors, which are uniformly distributed on a unit sphere. The vector components are stored and an index value is assigned to each of the gradient vectors in the table. Block 2 gets the first voxel of the volume data set and delivers it to block 3, which calculates the gradient vector at this voxel location by the differences of the six nearest neighbors. In block 4 dithering is applied to the gradient vector computed in the previous step. This can preferably be done by adding a pseudo-random number to its x, y, z components. Block 5 determines the index of the best matching vector in the look up table, which is closest to the dithered gradient. Next, in block 6 this index is stored for the current voxel. The whole procedure beginning with the computation of gradient vectors in block 3 is repeated for each voxel of the volume data set. Block 7 checks if there are any more voxels in the data set to be preprocessed. If this is the case, the next voxel is selected in block 8 and delivered to block 3 until for the complete set of voxels indices into the look up table have been determined.

Figure 2:
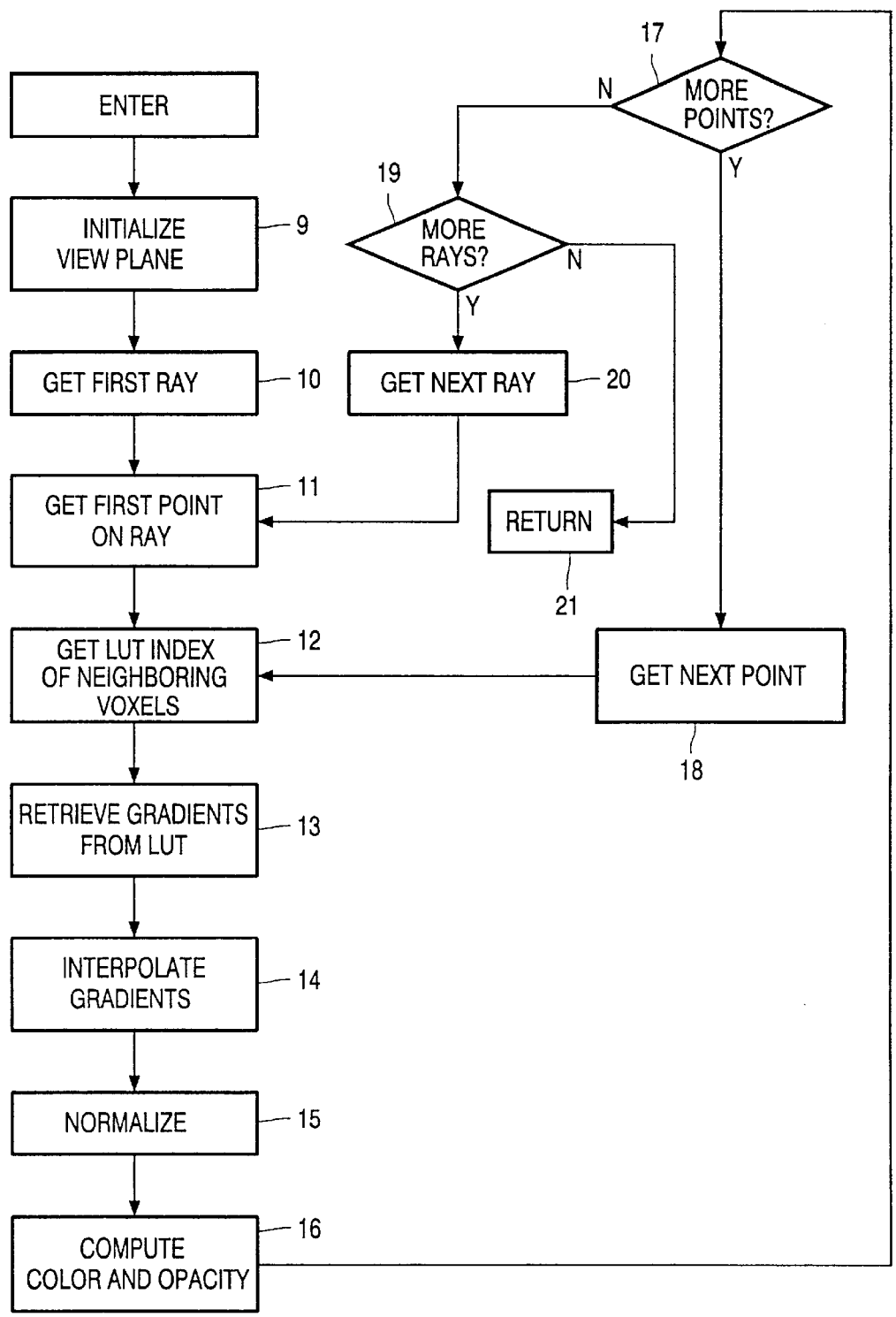
FIG. 2 shows a block schematic diagram illustrating the rendering of a volume data set on a two dimensional display by the method of the present invention.

Thereafter, the actual rendering of the volume data set ist carried out, which is illustrated in FIG. 2. In block 9 the position of the view plane is calculated depending on the viewing parameters such as eye position, view direction, view up vector etc. Then for each point on the view plane a ray is cast into the volume. Block 10 gets the first of these rays to be processed. Now samples have to be taken along the ray. In block 11 the first sample point on each ray is determined. For computing the gradient vector at the sample location in block 12 a look up into the table of gradients, which has been set up during the preprocessing shown in FIG. 1 (block 1), is performed for the eight neighboring voxels. In block 13 the gradients are retrieved from the look up table according to the indices assigned to the neighboring voxels. These gradient vectors are trilinearly interpolated in block 14 in order to obtain the gradient vector at the sample location. As described above, the interpolation results in a partial recovery of the true gradient value at the sample position because of the random dithering, which has been applied during the preprocessing before the assignment of gradient indices. After interpolation of normalized vectors, the resulting vector has no longer unit length and has therefore to be renormalized, which is done in block 15. A color value for the point in the two dimensional display corresponding to the actual ray has to be computed. This is done by calculating a color and an opacity value at each sample location in block 16. These values are accumulated along the ray and composed to a final color value after the whole ray has been sampled. The sampling is continued for all the sample points along the ray. Block 17 checks if there are any points left on the ray. If this is the case, block 18 gets the next sample point and delivers it to block 12. If there are no points left, block 19 checks if there are any more rays left on the view plane. If so, block 20 gets the next ray to be processed and delivers it to block 11. After processing of the complete view plane the rendering is finished with block 21, which corresponds to a return command of a subroutine in a computer program.

Figure 3:
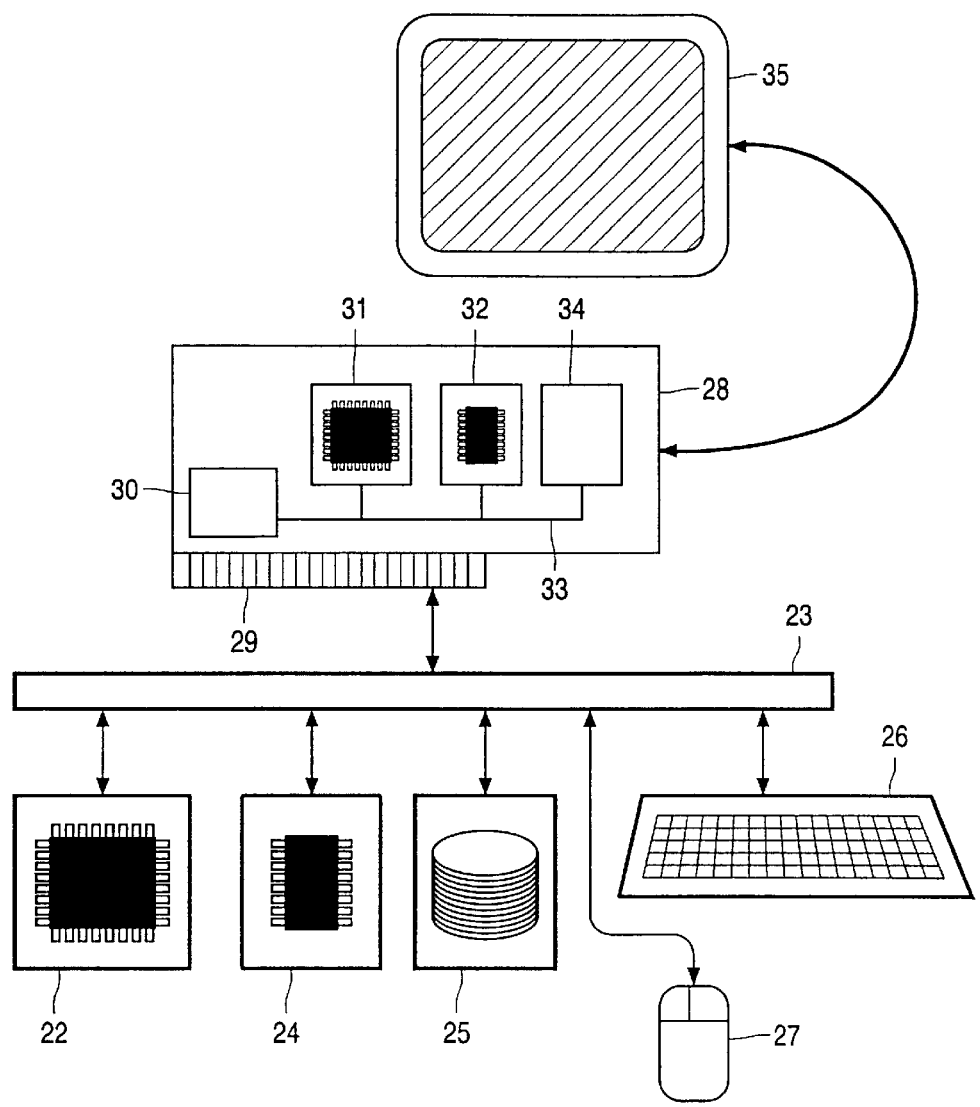
FIG. 3 shows a computer system with a video graphics card adapted to operate according to the method of the present invention.

FIG. 3 shows a computer system adapted to carry out the method of the invention. It contains a central processing element 22, which communicates to the other elements of the computer system over a system bus 23. A random access memory element 24 is attached to the bus 23. The memory 24 stores computer programs, such as operating system and application programs, which are actually executed on the computer system. During program execution the processing element 22 reads instructions, commands and data from the memory element 24. For long term storage of data and executable program code, a mass storage device, such as a hard disk drive, is connected to the bus 23. A keyboard 26 and a mouse 27 allow a user of the computer system to input information and to control the computer system interactively. Also attached to the system bus 23 is a video graphics adapter 28 with a connector element 29 to be fitted into a corresponding slot of the system bus 23. The video graphics adapter 28 contains an interface element 30 for communication between the other elements of the graphics adapter 28 and the components of the computer system. Furthermore, a graphics accelerator element 31 and a graphics memory element 32 are attached to the graphics adapter. These are interconnected by appropriate data connections 33. The memory element 32 comprises read only as well as random access memory and is correspondingly used to store the computer program of the present invention and parts of the volume data set, which is to be rendered. The graphics accelerator 31 is a microprocessor or a microcontroller for carrying out the volume rendering according to the method of the present invention. The graphics adapter 28 further contains a video signal generator 34 being connected to a computer monitor, which might be a CRT or a LCD display device. It generates video signals for the two dimensional display of the volume data set, which is rendered by the elements of the video graphics adapter 28.

Accordingly, while a few embodiments of the present invention have been shown and described, it is to be understood that many changes and modifications may be made thereonto without departing from the spirit and scope of the present invention as defined in the appended claims.

What is claim is:

1. A method of rendering a volume data set on a two dimensional display, wherein gradient vectors of voxel values are computed at arbitrary sample positions within the volume by interpolation between gradient vectors of neighboring voxels, the gradient vectors being retrieved from a look up table by means of an gradient index assigned to each voxel, characterized in that dithering is applied to the gradient vectors.

2. A method according to claim 1, characterized in that dithering is applied to the gradient vectors at each voxel position during the assignment of the gradient indices.

3. A method according to claim 1, characterized in that dithering is applied by adding a random value to each component of the gradient vectors.

4. A method according to claim 1, characterized in that the look up table contains normalized gradient vectors uniformly distributed on a unit sphere.

5. A method according to claim 1, characterized in that after the step of interpolation a renormalization of the gradient vectors at the sample positions is carried out.

6. A computer program for carrying out the method according to claim 1, characterized in that preprocessing of a volume data set comprises the steps of calculating gradient vectors at each voxel position;

dithering of the gradient vectors by adding random noise to each vector component;

assigning gradient indices to each voxel by matching dithered gradient data with corresponding vectors in a gradient look up table; and storing gradient indices for each voxel.

7. A computer program of claim 6, characterized in that rendering of the volume data on a two dimensional display comprises the steps of setting up a ray for each pixel in the two dimensional display;

determining sample points along the ray within the volume;

computing sample values by interpolation of neighboring voxel values at each sample point;

computing gradient vectors by interpolation of neighboring gradient vectors at each sample point, the neighboring gradient vectors being retrieved from the gradient look up table according to the respective gradient indices;

calculating color and opacity values for each sample position; and compositing of color and opacity values to a pixel value.

8. A video graphics adapter for a computer system with a program controlled processing element, characterized in that the graphics adapter has a programming, which operates according to the method of claim 1.

* * * * *